July 1, 1958
G. B. HARROLD
2,841,765
ELECTRIC OHMMETER
Filed March 18, 1955
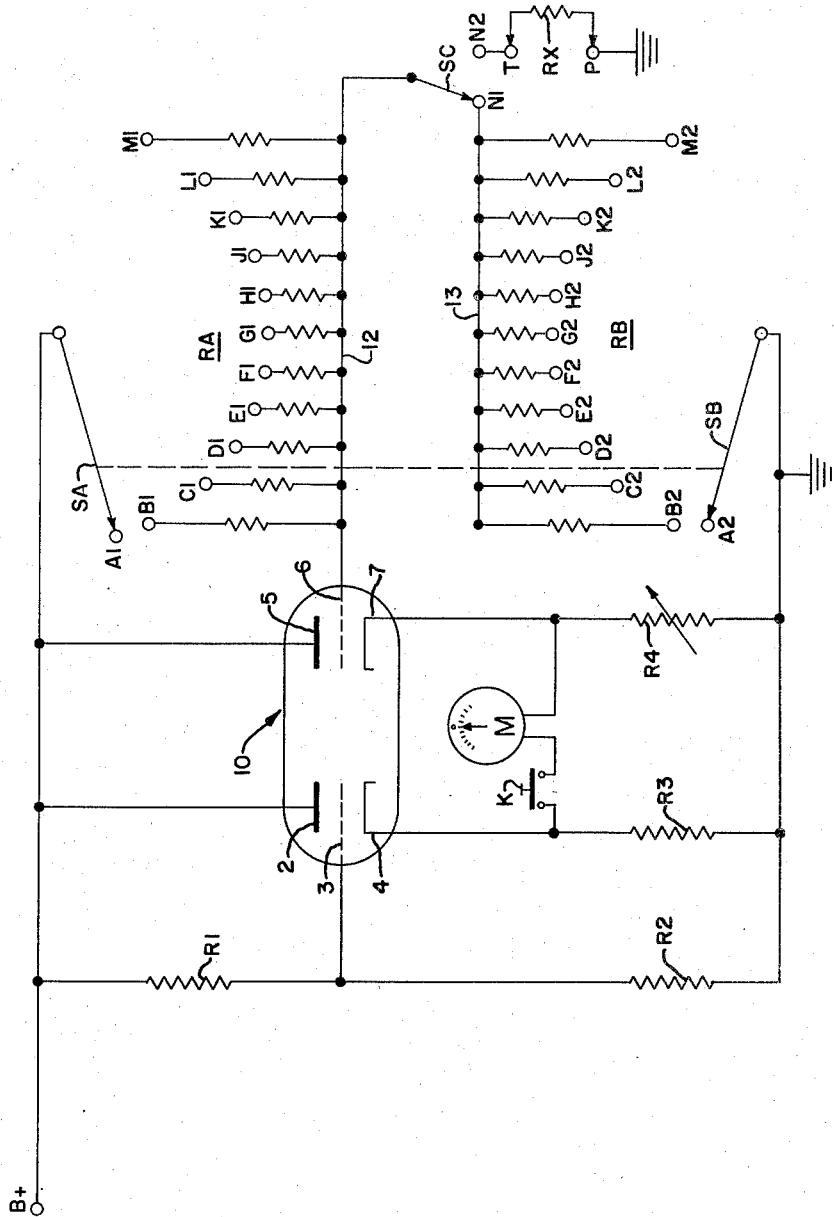
INVENTOR
G. B. HARROLD
BY
ATTORNEY United States Patent Office 2,841,765
Patented July 1, 1958

2,841,765

ELECTRIC OHMMETER

George B. Harrold, Geneva, N. Y., assignor to the United States of America as represented by the Secretary of the Navy Application March 18, 1955, Serial No. 495,371

2 Claims. (Cl. 324—62)

(Granted under Title 35, U. S. Code (1952), sec. 266)

The invention described herein may be manufactured and used by or for the Government of the United States of America for governmental purposes without the payment of any royalties thereon or therefor.

This invention relates to the checking and testing of resistors and more particularly to an electronic vacuum tube ohmmeter for the expeditious checking and testing of resistors.

In the production of resistors and electronic equipment, it has always been a problem to check economically and with any high degree of accuracy the tolerances and accuracy of manufactured resistors and of resistors within specific tolerances of a desired value to be used in the production of electronic equipment.

Heretofore, the accuracy and tolerances of resistors in production and in production lines were generally checked by using a standard ohmmeter circuit or by matching resistors with a bridge circuit.

The disadvantage of the standard ohmmeter circuit method is that its tolerance is limited to not less than approximately 5%. The bridge circuit method, though more accurate than the standard ohmmeter method, is inefficient and expensive in the time consuming process of matching resistors. Furthermore, neither of these methods functions very well on resistors of the order of 5 megohms and above, due to the relative insensitivity of the test indicator instruments under the impedance conditions existing in the test circuits when measuring resistors of high resistance values.

This invention provides a simple, economical, practical, and efficient means of checking and testing for such purpose.

The present invention, in overcoming these disadvantages, contemplates the provision of a four-armed resistor bridge circuit in conjunction with a pair of parallel-connected vacuum tubes having their anodes and cathodes connected across one diagonal of the bridge circuit and the control grids thereof connected across the other diagonal of the bridge circuit. Variable cathode bias means is provided to initially compensate for any inherent characteristic differences in the two tubes.

When the ratio of the resistors in the two arms connected to one of the tubes is equal to the ratio of the resistors in the other two arms connected to the other tube, the potentials on the control grids of the two tubes are equal and the bridge circuit is balanced, resulting in a zero deflection reading on a meter connected across the cathodes of the two tubes. Now, if an unknown resistor is substituted as one of the arms across the grid-cathode circuit of one of the tubes, the potentials on the grids will be equal if the value of the unknown resistor is the same as the value of the bridge resistor it replaced, resulting in a zero deflection indication by the meter thereby indicating that the unkown resistor is of the same value as the replaced resistor. But, if the substituted unknown resistor varies in value from the replaced bridge resistor, the potentials on the grids will be unequal and the two tubes become unbalanced, resulting in deflection of the meter needle thereby indicating that the unknown resistor is not of the same value as the replaced arm resistor. The meter may have percent gradations to indicate whether or not the value of an unknown resistor is within a predetermined tolerance of the desired value and acceptable for the intended use of the unknown resistor.

An object of the invention is the provision of a new and improved electronic vacuum tube ohmmeter.

Another object of the invention is to provide an electronic ohmmeter utilizing a resistor bridge circuit in conjunction with vacuum tube means.

A further object of the invention is the provision of a bridge circuit including vacuum tubes wherein the grid bias on the tubes is utilized in the determination of resistance measurements of unknown resistor values.

A still further object of the invention is to provide an ohmmeter which will check the value of an unknown resistor with a high degree of accuracy and with a minimum consumption of time.

Another object is the provision of an electronic ohmmeter that is simple and rugged in construction, stable, highly sensitive, and requires a minimum of filtering.

Other objects and many of the attendant advantages of this invention will be readily appreciated as the same becomes better understood by reference to the detailed description of a preferred embodiment of the invention as illustrated in the sole figure of the accompanying sheet of drawing.

Referring now to the sole figure of the drawing embodying the invention, there is shown thereon a four-armed resistor bridge circuit having two resistor arms, R1 and R2, of known values and of a predetermined R1/R2 ratio, and two selectively uncontrolled variable resistor arms RA and RB, also of known values and being arranged to have an RA/RB ratio equal to the R1/R2 ratio for all adjustments of the variable resistors RA and RB. The resistors R1 and R2 may be of the standard production line type or of the precision type, and the values of resistors R1 and R2 are preferably chosen to give a predetermined R1/R2 ratio of approximately 1:120, although the invention is not limited to this ratio and any suitable ratio may be used.

Variable resistor arm RA consists of a plurality of discrete precision resistors B1 to M1 of different and progressively increasing known values. Resistors B1 to M1 have one of their ends electrically tied together by lead 12 to thereby form a common terminal, and the other end of each resistor B1 to M1 is adapted to be selectively and discretely connected to adjustable switch SA. The common terminal 12 of resistors B1 to M1 is connected to a switch SC which is selectively adaptable to electrically engage terminals N1 or N2.

Variable resistor arm RB also consists of a plurality of discrete precision resistors B2 to M2 of different and progressively increasing known values. Resistors B2 to M2 have one of their ends electrically tied together by lead 13 to thereby form a common terminal N1 which is adapted to be selectively engaged by switch SC. The other end of each resistor B2 to M2 is adapted to be selectively and discretely engaged by switch SB which is connected to ground.

Switches SA and SB are ganged for movement in unison as indicated by the dotted line to uncontrollably vary the resistance values in arms RA and RB so as to maintain a constant RA/RB ratio which is equal to the R1/R2 ratio. The values of resistors B1 to M1 and B2 to M2 are selected so that the ratios B1/B2, C1/C2, D1/D2, . . . M1/M2 are constant and equal to the ratio RA/RB.

Contacts T and P, connected to contact terminal N2 and ground respectively, are adaptable to receive an unknown resistor RX whose resistance value and tolerance are to be checked. Selective switch SC functions to connect either arm RB or the unknown resistor RX to the bridge circuit as one of the bridge arms.

A voltage supply, indicated as B+ is connected across one diagonal of the bridge. A dual triode tube 10 has the anodes and cathodes thereof also connected across the same diagonal, the anodes 2 and 5 being connected to the positive terminal of the diagonal and the cathodes 4 and 7 being connected to the ground terminal of the diagonal through resistors R3 and R4. The grids of tube 10 are connected to the other diagonal of the bridge. More specifically, grid 3 is connected to the junction of resistors R1 and R2, and grid 6 is adapted to be selectively connected to either the junction of RA and RB or the junction of RA and RX, depending upon the selected position of switch SC.

A sensitive ammeter, preferably of the microammeter type and generally indicated at M, is connected through a normally open keying switch K to the cathodes 4 and 7 to measure the unbalance of current flow through the two triode sections of tube 10. Normally open switch K prevents excessive current flow from damaging meter M during the switching operations of switches SA, SB and SC. The meter M is of the zero-center-scale type of which the scale gradations may be in percentages or in microamperes. If the potentials on the two grids are equal, the bridge is balanced, and the potentials existing on cathodes 4 and 7 will be equal. Under this condition, no current will flow through meter M and the indicating needle of the meter will not deflect thereby resulting in a zero indication. Whereas if the potentials on the two grids are unequal, the bridge is unbalanced, and current will flow through meter M due to the potential differences existing at cathodes 4 and 7, and the indicating needle of meter M will deflect from the zero position an amount corresponding to the current flow therethrough. Resistor R4 is variable to initially balance the bridge by compensating for the inherent characteristic differences in the two triode sections and for the tolerances of resistors R1 and R2 if they are of the standard production line type.

In operation, with the tube 10 being energized from the power supply B+ and with RX connected to terminals T and P, switch SC is thrown to contact terminal N1, and switches SA and SB are adjusted in unison until switch SB is in engagement with the resistor of arm RB which resistor RX should approximate. Variable resistor R4 is then adjusted to compensate for characteristic differences of the two triode sections until meter M reads zero when switch K is depressed. Since the ratio of arms RA/RB is equal to the ratio R1/R2 and since the differences in tube characteristics are compensated by resistor R4, the bridge is now in a balanced condition.

With switch K in the open position, switch SC is now moved into engagement with terminal N2, thereby replacing the resistor of arm RB with resistor RX. Then switch K is depressed to complete the circuit for meter M, and if resistor RX is equal to the replaced resistor, meter M will read zero as explained hereinabove. But if RX differs in value from the replaced resistor by as much as 0.1 percent, the needle of meter M will deflect from the zero position, and, if the scale is in percent gradations, it may readily be determined if resistor RX is within a specified tolerance of a desired value.

From the foregoing, it is seen that the invention provides an inspection and checking electronic ohmmeter device for resistors which is highly sensitive and requires the minimum consumption of time for the checking and inspection operation of resistors.

Obviously many modifications and variations of the present invention are possible in the light of the above teachings. It is therefore to be understood, that within the scope of the teachings herein and the appended claims, the invention may be practiced otherwise than as specifically described.

What is claimed as new and desired to be secured by Letters Patent of the United States is:

1. An electronic vacuum tube ohmmeter circuit for testing and checking resistors, comprising a pair of triodes connected in parallel, a source of voltage connected across the anode-cathode circuits of said triodes for applying energizing potential thereto, adjustable bias means in the cathode circuit of at least one of said triodes to compensate for the inherent characteristic differences of said triodes, a first resistor of a fixed predetermined value connected between the anode and grid of one of said triodes, a second resistor of a fixed predetermined value connected between the grid and cathode of said one triode, the predetermined resistance values of said first and second resistors being such that the quotient of said first resistor to said second resistor results in a predetermined ratio, a first selectively variable resistance means connected between the anode and grid of the other of said triodes, a second selectively variable resistance means adaptable to be connected between the grid and cathode of said other triode, unicontrol means for selectively varying said first and second variable resistance means in unison whereby the quotient of the resistance value of said first variable resistance means to the resistance value of said second variable resistance means remains constant and equal to said predetermined ratio for all variations of said first and second variable resistance means, terminal means for receiving the resistor to be tested and adaptable to be connected between the grid and cathode of said other triode, switch means for selectively and discretely connecting said second variable resistance means and said terminal means between the grid and cathode of said other triode, and indicator means connected across the cathodes of said triodes and responsive to the current flow through said triodes to indicate any deviation from said predetermined ratio when said terminal means with a resistor to be tested is connected between the grid and cathode of said other tube.

2. The circuit of claim 1, wherein each of said first and second variable resistance means comprises a plurality of resistors of different and predetermined values.

References Cited in the file of this patent

UNITED STATES PATENTS 2,695,987     McCollom et al. _____ Nov. 30, 1954
2,697,203     Shepard _____ Dec. 14, 1954